Sept. 24, 1968 RYOZO KITAZAWA 3,402,935

AUTOMATIC RECORD PLAYER APPARATUS

Filed Dec. 6, 1966 10 Sheets-Sheet 1

INVENTOR.
Ryozo Kitazawa

BY Hill, Sherman, Meroni, Gross & Simpson
ATTORNEYS

INVENTOR.
Ryozo Kitazawa

BY Hill, Sherman, Meroni, Gross & Simpson
ATTORNEYS

AUTOMATIC RECORD PLAYER APPARATUS

Filed Dec. 6, 1966 10 Sheets-Sheet 3

INVENTOR.
Ryozo Kitazawa

BY Hill, Sherman, Meroni, Gross & Simpson
ATTORNEYS

INVENTOR.
Ryozo Kitazawa

BY Hill, Sherman, Meroni, Gross & Simpson
ATTORNEYS

INVENTOR

Ryozo Kitazawa

BY Hill, Sherman, Meroni, Gross + Simpson

ATTYS.

INVENTOR.
Ryozo Kitazawa

BY Hill, Sherman, Meroni, Gross & Simpson
ATTORNEYS

Sept. 24, 1968 RYOZO KITAZAWA 3,402,935

AUTOMATIC RECORD PLAYER APPARATUS

Filed Dec. 6, 1966 10 Sheets-Sheet 7

INVENTOR
Ryozo Kitazawa

BY Hill, Sherman, Meroni, Gross & Simpson
ATTYS.

Sept. 24, 1968 RYOZO KITAZAWA 3,402,935

AUTOMATIC RECORD PLAYER APPARATUS

Filed Dec. 6, 1966 10 Sheets-Sheet 8

INVENTOR

Ryozo Kitazawa

BY Hill, Sherman, Meroni, Gross & Simpson

ATTYS.

INVENTOR.
Ryozo Kitazawa

BY Hill, Sherman, Meroni, Gross & Simpson
ATTORNEYS

Sept. 24, 1968 RYOZO KITAZAWA 3,402,935

AUTOMATIC RECORD PLAYER APPARATUS

Filed Dec. 6, 1966 10 Sheets-Sheet 10

INVENTOR.
Ryozo Kitazawa

BY Hill, Sherman, Meroni, Gross & Simpson
ATTORNEYS

United States Patent Office 3,402,935

Patented Sept. 24, 1968

3,402,935

AUTOMATIC RECORD PLAYER APPARATUS

Ryozo Kitazawa, Kawasaki-shi, Kanagawa-ken, Japan, assignor to Nippon Columbia Kabushikikaisha, Nippon Columbia Co., Ltd., Tokyo, Japan, a corporation of Japan Filed Dec. 6, 1966, Ser. No. 599,521
Claims priority, application Japan, Dec. 8, 1965, 40/75,770
7 Claims. (Cl. 274—10)

ABSTRACT OF THE DISCLOSURE

An automatic record player that selects and plays one or both sides of a record using a double-headed electromagnet support for the transducer and which has novel record holding, selecting and driving means.

This invention relates to an automatic record player apparatus, and more particularly to an automatic record player apparatus of the type in which a desired record is automatically selected from a number of records arranged in the apparatus and is played.

Accordingly, one object of this invention is to provide an automatic record player apparatus having specific means for automatically selecting a desired record from a number of records placed in the apparatus.

Another object of this invention is to provide an automatic record player apparatus which is provided with a pickup device employing a double-headed electromagnet so as to ensure successive playing of both sides of a selected record.

Another object of this invention is to provide an automatic record player apparatus which is provided with a unit for safely and accurately loading a record on the turntable or easily removing the record therefrom.

Another object of this invention is to provide an automatic record player apparatus in which the diameter of the turntable is selected in accordance with the revolution number of a record to thereby dispense with a speed change mechanism.

Another object of this invention is to provide an automatic record player apparatus in which a record mounted on the turntable can be detachably loaded on a support unit disposed radially on a rotary support disc.

Another object of this invention is to provide an automatic record player apparatus which is provided with specific memory means positioned under a rotary support disc.

Still another object of this invention is to provide an automatic record player apparatus in which a drive source is moved into driving contact with the turntable having mounted thereon a record to revolve the record.

Other objects, features and advantages of this invention will become apparent from the following description taken in conjunction with the accompanying drawings, in which.

Figure 1:
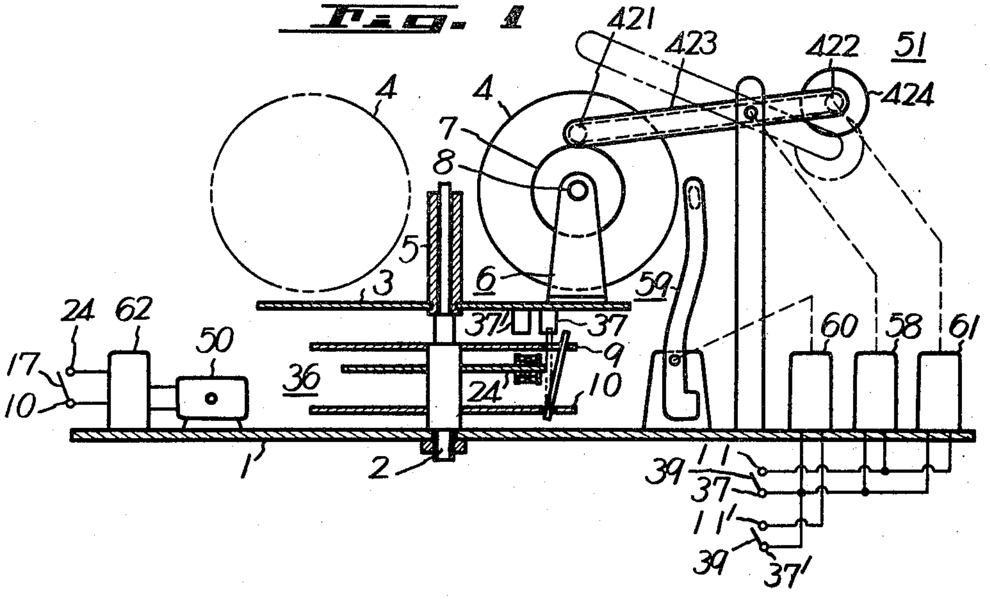
FIGURE 1 is a diagram schematically illustrating one example of the entire construction of an automatic record player apparatus of this invention.
Figure 3:
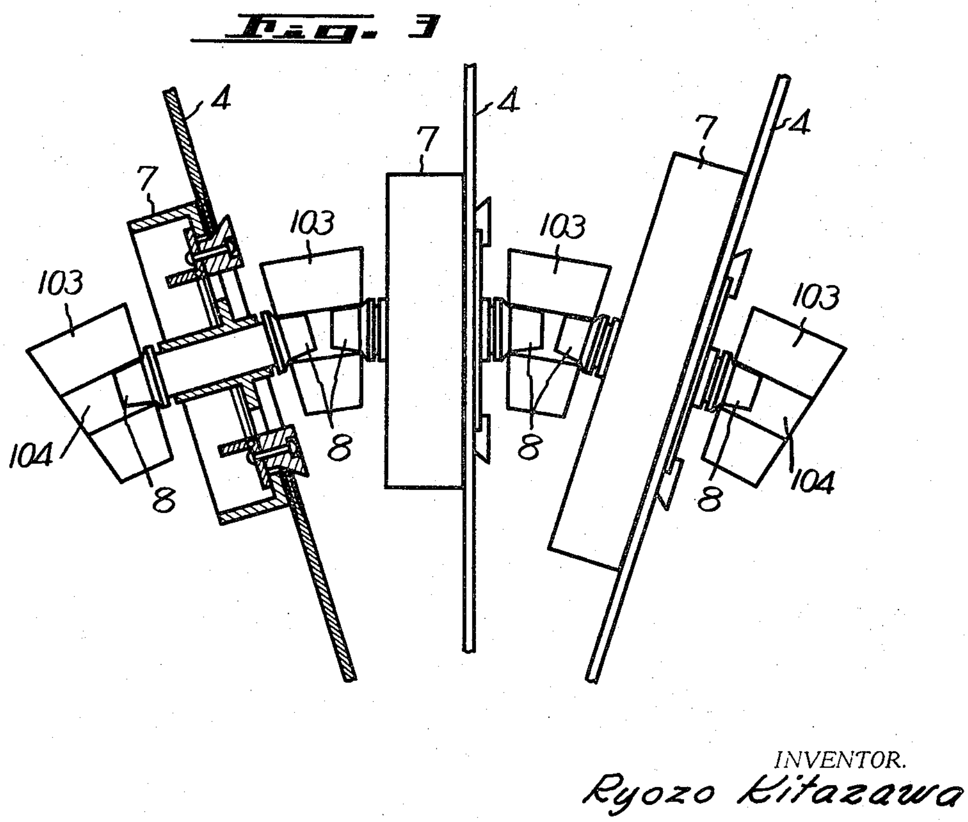
FIGURE 3 is an enlarged plan view of the record supporting means.

In FIGURE 1 reference numeral 1 indicates a horizontal fixed base plate or a deck. The horizontal fixed plate 1 has vertically planted thereon, for example, a shaft 2, and the shaft 2 has rotatably affixed thereto a rotary support disc 3. In this case, the rotary support disc 3 is attached to the shaft at right angles thereto so as to be substantially in parallel to the horizontal fixed plate 1. On the rotary support disc 3 there are arranged radially about its center a plurality of records 4 at equiangular intervals. Reference numeral 5 identifies a boss or a sleeve of the rotary support disc 3. Each of the records 4 is positioned in a plane substantially perpendicular to the rotary support disc 3. In FIGURE 1 reference numeral 6 designates a turntable support unit planted on the rotary support disc 3 substantially vertically thereto, which will be described later on. A turntable 7 having a predetermined thickness is attached to the top of the support unit 6 rotatably about a shaft 8 of the turntable 7, and the record 4 is mounted on the turntable 7 through the use of a suitable attaching device M which will be described later on.

Figure 2A:
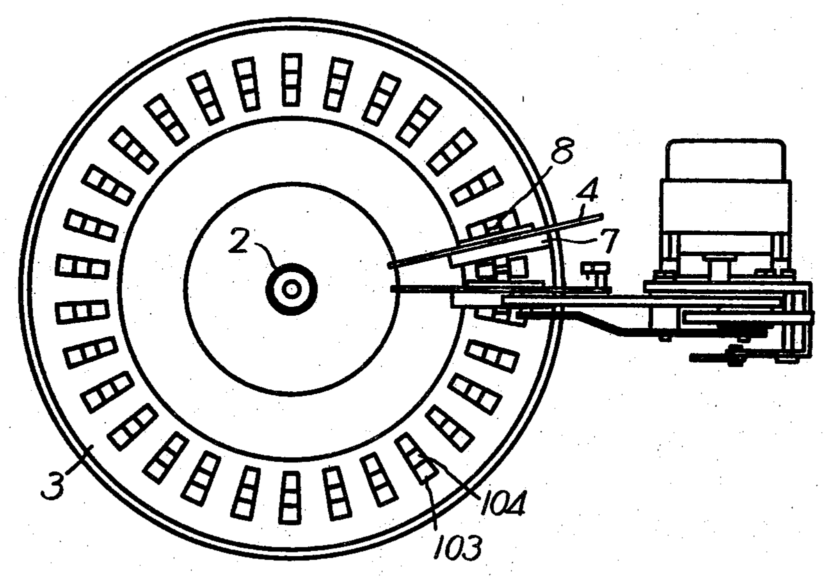
FIGURE 2A is a plan view showing record supporting means.
Figure 2B:
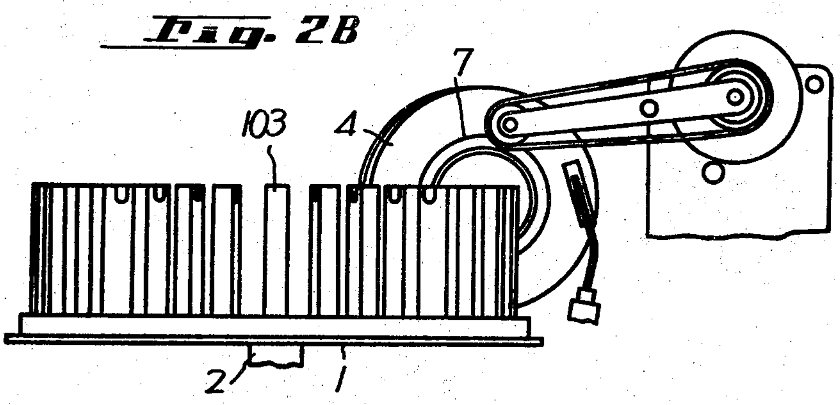
FIGURE 2B is a side view of the record supporting means shown in FIGURE 2A.

A description will be given in connection with the aforementioned support unit 6. As illustrated in FIGURE 2, a plurality of support posts 103 are disposed on the rotary support disc 3 affixed to the shaft 2 in such a manner as to lie on a suitable circumference about the shaft 2 radially at equiangular intervals and substantially in a perpendicular direction with respect to the rotary support disc 3. In this case, the free end of each support post 103 has formed in its planar top end portion a bearing groove 104 for receiving the shaft 8 of the turntable 7 at such a location as to be on the same circumference about the shaft 2. On the support post 103 is mounted the turntable of such a construction that the end portion of its shaft 8 may be detachably supported by the groove 104 of each support post 103. The turntable 7 has suitable means and is designed so that the record 4 may easily be mounted thereon and dismounted therefrom, and the size of its driving surface (the outer diameter thereof) is selected to comply with the rated revolution number of the record 4 such as a 45 r.p.m. record, a 33 r.p.m. record and so on. The bearing groove 104 is formed to be a little arc-shaped or both end portions of the shaft 8 of the turntable is so configured as to conform with the arc-shaped groove 104 in its manufacturing process. This ensures stable and accurate holding of the shaft 8 of the turntable 7.

Figure 4:
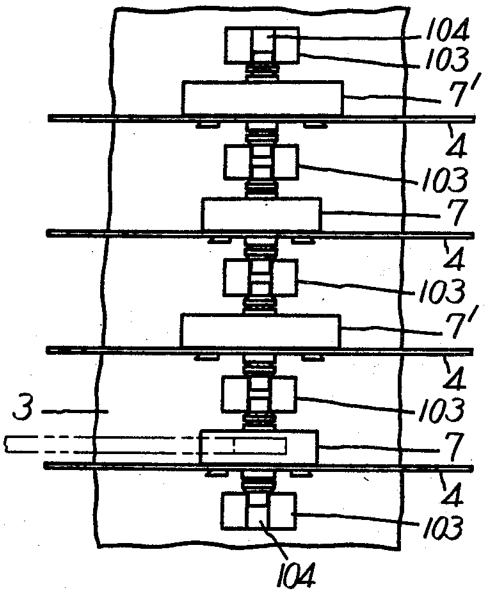
FIGURE 4 is a plan view schematically illustrating one portion of another example of the record supporting means.
Figure 5:
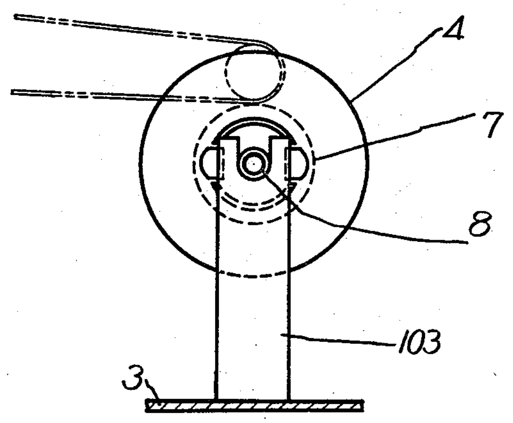
FIGURE 5 is a side view of the record supporting means depicted in FIGURE 4.

FIGURES 4 and 5 illustrate another embodiment of this invention in which records 4 are placed in a row or in parallel to one another on a support plate 3 and selections of a record to be played is accomplished by reciprocating movement of the support plate 3. That is, both ends of the shaft of each turntable 7 or 7' are fitted into the bearing grooves 104 in such a manner that the record 4 held on the turntable 7 by locking means may assume a position between adjacent support posts 103 vertically planted on the support plate 3. The portion having mounted thereon a required number of records in the manner described just above is referred to as a playing mechanism in this specification. The driving portion of a rubber belt or an idler pressed into driving contact with the driving surface of the turntable is referred to as a diving power transmission mechanism, which will be described later on.

According to the aforementioned turntable support unit, it is possible that the playing mechanism is moved in the axial direction of the turntable shaft 8 to a desired position while the driving power transmission mechanism is fixed. Otherwise, it is also possible that the driving power transmission mechanism is moved in parallel to the axis of the turntable shaft 8 to a desired position while the playing mechanism is fixed.

In the present invention, as has been described above, a turntable having a record easily pivoted to its shaft is picked up and played without the necessity of replacement of records prior to playing as in the prior art. In the case of using a 45 r.p.m. record the record is mounted on a turntable having a shaft the outer radius of which complies with the required revolution number and in the case of a 33 r.p.m. record the record is mounted on a turntable having a shaft the outer radius of which complies with the required revolution number. Therefore, there is no need of providing a special speed change mechanism, with the result that the playing device can be simplified.

The turntable illustrated is rotatably affixed to its shaft, and the shaft is adapted not to rotate when fitted in the grooves of the support posts. However, it is also possible that the turntable and its shaft are formed integrally, the shaft being adapted to rotatably fit in the grooves of the support posts.

Figure 6:
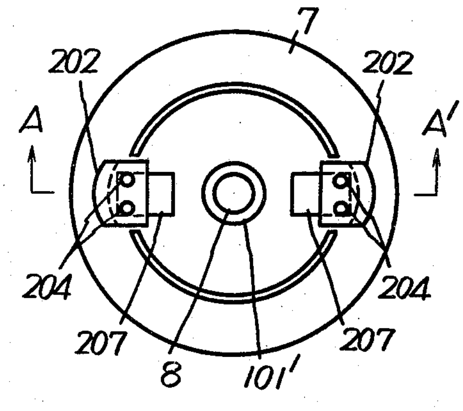
FIGURE 6 is a plan view of a record locking unit employed in this invention.
Figure 7:
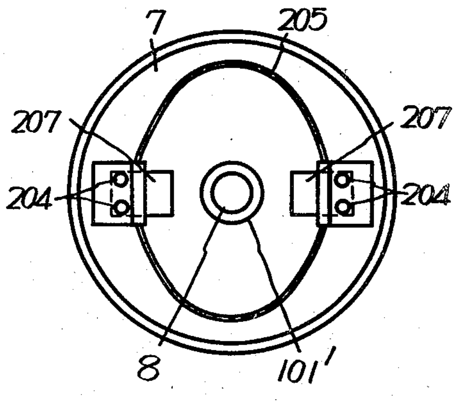
FIGURE 7 is a bottom view of the record locking unit illustrated in FIGURE 6.
Figure 8:
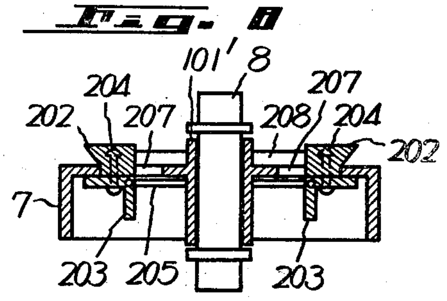
FIGURE 8 is a cross-sectional view taken along the line A—A in FIGURE 6.
Figure 9:
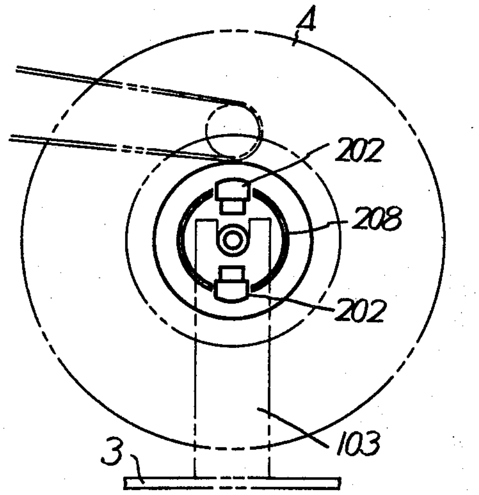
FIGURE 9 is a schematic diagram showing belt drive condition when a record is locked by the record locking unit shown in FIGURE 6.
Figure 11:
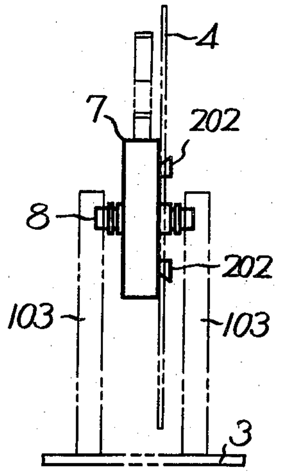
FIGURE 11 is a side view of FIGURE 9.
Figure 10:
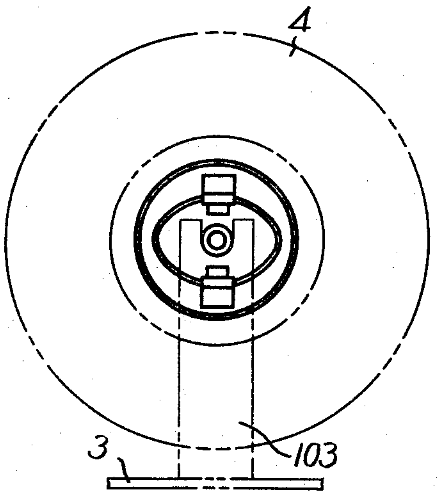
FIGURE 10 is a diagram illustrating another example of the belt drive.

FIGURES 6 to 8, inclusive, illustrate the locking means M for releasably locking a record to the turntable 7. Reference numeral 201' indicates a bearing portion for the shaft of the turntable 7, 202 a pair of locking elements mounted on the turntable 7, 203 record locking knobs each fixed to the locking element and provided on the back of the turntable 7, and 204 screws for clamping the locking elements 202 and the record locking knobs 203. Reference numeral 205 designates a spring attached to the locking elements 202, 207 guide grooves for the locking elements 202, and 208 a fitting portion for the central opening of a record 38$\phi$. In FIGURE 9 reference numeral 4 identifies a record mounted on the turntable 7.

Figure 12:
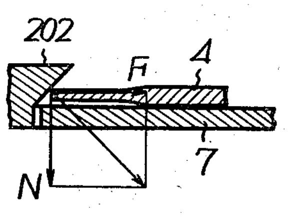
FIGURE 12 is an explanatory diagram of a clamping force exerted on a record when the record is locked.

A description will be made in connection with the aforementioned components. As illustrated in FIGURES 6 to 8, inclusive, at least two locking elements 202 are provided on the turntable 7 at locations substantially symmetrical about the shaft 8 of the turntable 7. These locking elements are each adapted to move in a direction of the shaft of the turntable or the periphery of the turntable along the guide groove 207 provided in a radial direction of the turntable. The spring 205 attached to the two locking elements 202 or the locking knobs 203 normally biases the locking elements 202 or the locking knobs 203 toward the periphery of the turntable 7. In inoperative condition the spring 205 presses the locking elements 202 or the locking knobs 203 against the outer side of the guide groove 207. In mounting the record 4 on the turntable 7, the two record locking knobs 203 are pushed towards the shaft 8 of the turntable 7 against the bias force toward the periphery of the turntable 7, and then the central opening of the record 4 is fitted with the fitting portion 208. Upon releasing the pressure applied to the locking knobs 203 with fingers, the action of the spring 205 exerts a clamping force F upon the record 4 in the direction to its periphery and a vertical component N of the force F upon the record 4 toward the turntable 7, since the contact portion of the locking elements 202 with the record 4 is inclined outwardly of the turntable 7, as shown in FIGURES 8 and 12. As a result of this, the record 4 is completely locked to the turntable 7.

In the above example, the spring 205 is a ring-shaped one such as a piano wire but it may be a coiled spring or a plate spring. Further, the shape of the spring is not limited specifically to that shown in the example. In short, the spring 205 is such as performs the function to normally bias the locking elements 202 toward the outer ends of the guide grooves 207. In the foregoing the two locking elements 202 are simultaneously moved, but it is possible that one of the locking elements 202 is adapted to be movable while the other is fixed to the turntable 7. Further, the same results can be obtained, even if the record is clamped by one locking element 202 while the other being dispensed with. In the illustrated example the turntable 7 is formed separately from its shaft 8, but it is also possible that they are formed integrally or that the record opening fitting portion 208 formed integral with the turntable 7 is formed to be of an adapter type separately from the turntable.

The above-described record locking mechanism is simple in construction and easy to handle. Further, since the locking elements are always pressed against the margin of the central opening of the record even while rotating in a vertical plane, no clearance is produced between the record and the locking elements to prevent the disadvantage such as the variations in revolving speed, and in addition, when the reverse side of the record directly facing the turntable is played the record is tightly held on the turntable without coming off from the turntable.

Figure 13:
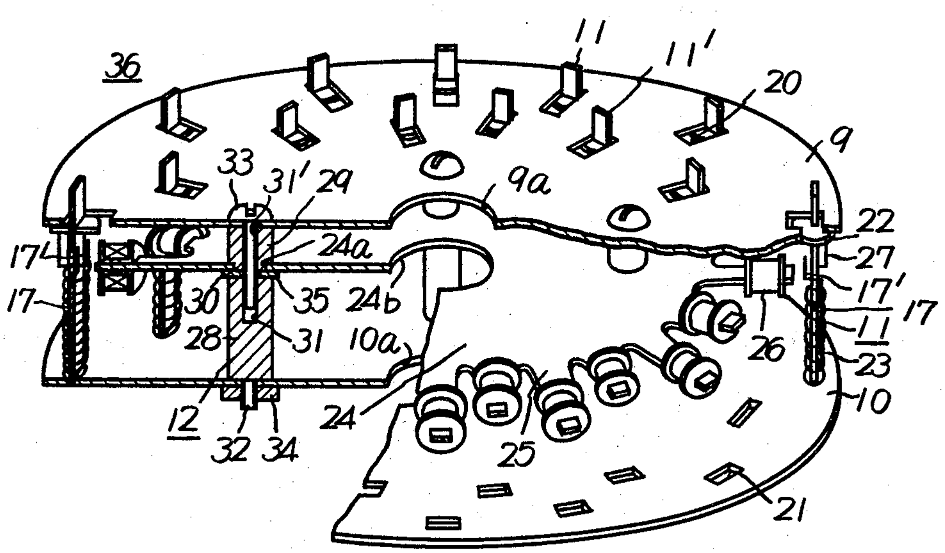
FIGURE 13 is a view in perspective, and partly in cross-section, illustrating one example of a memory device used in this invention.

In a stationary memory device 36 of this invention, a pair of conductive discs 9 and 10 are provided, and a plurality of memory elements 11 are disposed between the discs 9 and 10, as illustrated in FIGURE 13. The discs 9 and 10 are spaced apart at a predetermined distance in parallel to each other by a plurality of stanchions 12.

Figure 14:
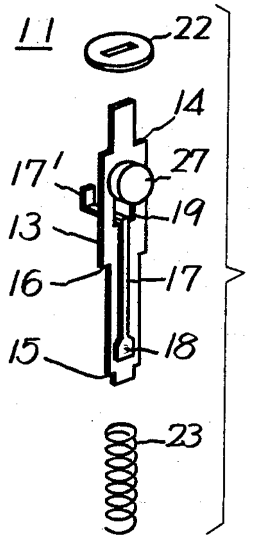
FIGURE 14 is an enlarged perspective view of a memory element employed in the memory device depicted in FIGURE 13.

As is clearly shown in FIGURE 14, each memory element 11 is formed of an elongated plate 13 which is preferred to be a magnetic material having a predetermined thickness and the element is configured in such a shape as having stepped portions 14 and 15 in the proximity of its both ends and a pair of stepped portions 16 substantially at its center in its lengthwise direction. Further, one free end of a ribbon-shaped resilient conductive contactor 17 is fixed to the plate 13 in the vicinity of one end thereof (the stepped portion 15 in the figure) by means of a rivet 18 or the like in a manner so that the contactor 17 extends on one surface of the plate 13 in its lengthwise direction. Meanwhile, the other free end portion of the contactor 17 is bent at right angles and the bent portion is projected out through an aperture 19 bored in the plate 13 in the neighborhood of its center. The projecting portion of the contactor 17 is bent upwards once again, providing a contact portion 17'. In order for such a contactor 17 to make close contact with the plate 13 at all times, it is biased by utilizing its resiliency.

As is apparent from FIGURE 13, in order to engage the upper and lower stepped portions 14 and 15 of each memory element 11 with the pair of discs 9 and 10, a plurality of apertures 20 and 21 are made in the discs 9 and 10 at corresponding locations. The discs 9 and 10 are assembled together with both ends of each of the memory elements 11 being fitted into the corresponding apertures 20 and 21 of the discs 9 and 10 in such a manner as to bridge the discs 9 and 10. In this case, the upper end of each memory element 11 is projected upwardly from the disc 9, and each memory element 11 is arranged so that its face having the contact portion 17' faces the center of the disc 9 and crosses its radial direction substantially at right angles thereto. The apertures 20 of the disc 9 are configured to be a little elongated in the radial direction of the disc 9 so as to ensure that the top end portion of each memory element 11 moves in the radial direction of the disc 9 along the full length of the aperture 20 about the aperture 21 of the disc 10. A washer 22 is interposed between the disc 9 and the upper stepped portion 14 of each memory element 11, and a spring 23 is provided between the disc 10 and the centrally disposed stepped portions 16 of each memory element 11 so as to push up the memory element at all times. Each washer 22 is disposed in suitable frictional contact with the disc 9, which serves to smooth the aforementioned movement of each memory element 11. The spring 23 ensures that each memory element is accurately held at two positions, one being the outermost side of the aperture 20 and the other being the innermost side thereof, and further the spring 23 prevents the memory element 11 from being shifted when subjected to high shock and/or vibration conditions. The contact portion 17' of the contactor 17 projects toward the center of the discs 9 and 10. The apertures 20 and 21 of the discs 9 and 10 are so disposed that the aforementioned memory elements 11 are located on two different concentric circles about the center of the discs 9 and 10 at substantially equiangular intervals corresponding to those of the records 4 arranged on the support disc 3. The number of the apertures bored in each disc is twice as many as that of the records 4 provided on the support disc 3, and consequently the number of the memory elements 11 is naturally twice as many as the records 4. In FIGURE 13 the memory elements 11 on the inner circle are identified at 11' and those on the outer circle are designated at 11 for convenience's sake in description. The apertures 20 and 21 are located in such a relationship that the memory elements 11' on the inner circle are each disposed, for instance, midway between adjacent memory elements 11 on the outer circle.

Further, a disc 24 which is preferred to be of a conductive magnetic material is interposed between the discs 9 and 10. The periphery of the disc 24 has projected therefrom a plurality of projections 25 in a spidery manner, each being opposite to each memory element. Each of the projections 25 has mounted thereon an electromagnetic coil 26. The relationship between each electromagnetic coil 26 and each of the memory elements 11 and 11' is such that upon energization of the electromagnetic coil 26 the memory element disposed opposite thereto is attracted inwardly to the electromagnet corresponding to the energized electromagnetic coil 26 so that the contact portion 17' of the contactor 17 of the memory element is electrically connected with the end of the projection 25 of the disc 24. Upon deenergization of the electromagnet, the memory element is pulled back outwardly to disengage the contact portion 17' from the disc 24. In this case, it is possible to facilitate the movement of the memory element by the provision of a magnet 27 on the memory element, as shown in FIGURES 13 and 14, so as to ensure good contact of the contact portion 17' with the end of the projection 25 of the disc 24.

The disc 24 is attached to the aforementioned stanchions 12 and is electrically insulated from the disc 10. In order to suitably couple the discs 24 and 9, each stanchion 12 is composed of a first cylindrical support member 28 made of, for example, an insulator material and a second cylindrical support member 29 made of an electrically conductive material. In this case, the second support member 29 has formed at the lower end thereof a diametrically reduced portion 30 capable of being fitted into an aperture 24*a* of the disc 24, and a hole 31' is bored through the second support member 29 centrally thereof. The first support member 28 has formed therein screw-threads 31 from its upper end to middle point thereof and has projected from its lower end a screw 32. As illustrated in FIGURE 13, a screw 33 made of an insulator material is screwed into engagement with the screw-threads 31 of the first support member 28 through the hole 31' of the second support member 29 while the second support member being interposed between the discs 9 and 24, thus assembling together the discs 9 and 24. Further, the screw 32 of the first support member 28 is projected downwards through a hole of the disc 10 and a nut 34 is threadably engaged with the screw 32 to clamp the disc 10 to the first support member 28, thus assembling together the three discs 9, 24 and 10. Reference numeral 35 designates an insulator such, for example, as a washer, which electrically insulates discs 24 and 10 from each other. In this manner, a fixed memory device 36 of this invention is constituted.

The discs 9, 10 and 24 have centrally disposed apertures 9*a*, 10*a* and 24*a* respectively, through which these discs 9, 10 and 24 are affixed to the aforementioned shaft 2 planted on the stationary part, for example, the support plate 1.

Figure 15:
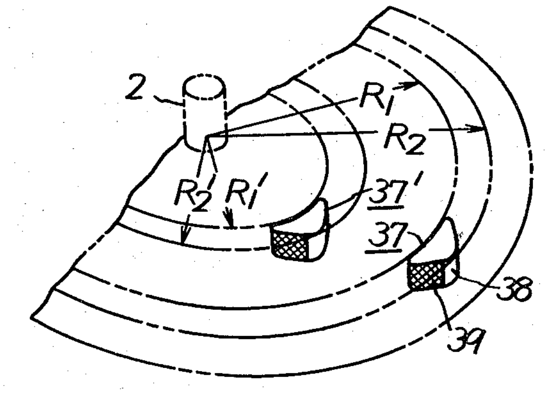
FIGURE 15 is a perspective view showing one example of an engaging member used in this invention.

Meanwhile, the underside of the aforementioned support disc 3 has attached thereto two engaging pieces 37 and 37'. In this case, the engaging pieces 37 and 37' are made of an electrically insulating material and are configured in a substantially isosceles triangular shape while having a predetermined thickness, as shown in FIGURE 15. The engaging pieces 37 and 37' are each attached to the underside of the support disc 3 in a manner so that the respective vertexes 38 and 38' defined by the two equal sides of the engaging pieces 37 and 37' are outermost from the shaft 2. Further, the portion of one of the two equal sides of each engaging piece is coated with a conductive film 39 as indicated in FIGURE 15, excepting the portion near the vertex. When the memory element 11 or 11' is in its innermost position, the rotation of the support disc 3 causes the memory element to move into contact with the conductive film 39 of the engaging piece 37 or 37', and further rotation of the support disc causes the memory element to move to its outermost position along the inclination of the side of the engaging piece. Accordingly, the length of each aperture 20 of the disc 9 in the radial direction of the disc 9 is selected to be substantially equal to the difference between a distance $R_1$ from the face of the engaging piece, for example, 37 on the side of the shaft 2 to the center of the shaft 2 and a distance $R_2$ from the vertex 38 of the engaging piece 37 to the center of the shaft 2. As a result of this, the portion of the memory element 11 inserted into the aperture 20 can be moved a distance corresponding to that between the base and the vertex of the engaging piece 37.

Figure 16:
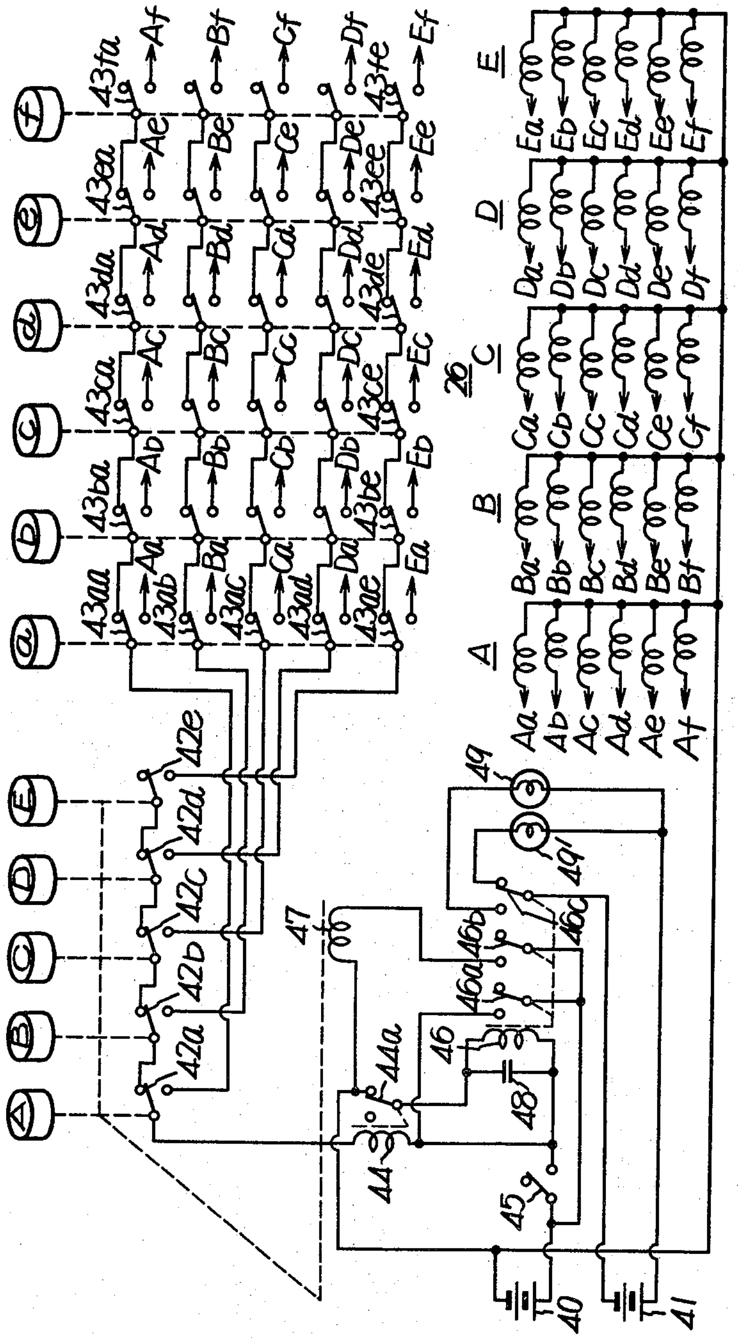
FIGURE 16 is an electric circuit diagram for use with the memory device shown in FIGURE 13.

FIGURE 16 is a connection diagram illustrating one example in which thirty coils 26 and consequently thirty memory elements 11 and 11' are driven. Reference numeral 40 indicates a DC power source for driving the coils 26 and 41 a power source for indicating lamps. Reference characters A to E designate letter selecting buttons, 42_a_ to 42_e_ their respective contacts, and _a_ to _f_ number buttons respectively. The number buttons _a_ to _f_ have each five interlocking change-over contacts (43_aa_ to 43_ae_), (43_ba_ to 43_be_), (43_ca_ to 43_ce_), (43_da_ to 43_de_), (43_ea_ to 43_ee_) and (43_fa_ to 43_fe_). These contacts are normally held in the condition shown in the figure. The thirty coils, namely electromagnetic coils 26 mounted on the projections 25 of the disc 24 (identified by A to E with suffixes _a_ to _f_ in the figure) are connected to the power source 40 through the aforementioned contacts in such a manner as to be energized by pressing the letter buttons and the number buttons corresponding to these coils. Since their connections are well-known in the art and is not related directly to the principles of this invention, no detailed description will be given in this specification. In the example illustrated in the figure, a relay 44 is incorporated in series in a circuit common to the aforementioned coils. Connected to the power source 40 are a series circuit consisting of a credit contact 45 to be closed by putting in the so-called coin, a relay 46 and a normally closed contact 44_a_ of the relay 44, and a series circuit consisting of a normally open contact 46_b_ of a relay 46 and a plunger 47. In parallel to the relay 46 is connected a capacitor 48. Reference numeral 46_a_ represents a self-holding contact of the relay 46, and 46_c_ a contact of the relay 46, which changes over a credit indicating lamp 49 and a stand-by lamp 49'. The plunger 47 serves to hold a selectively pressed letter button in its pressed condition only when the coil 26 is energized.

Figure 17:
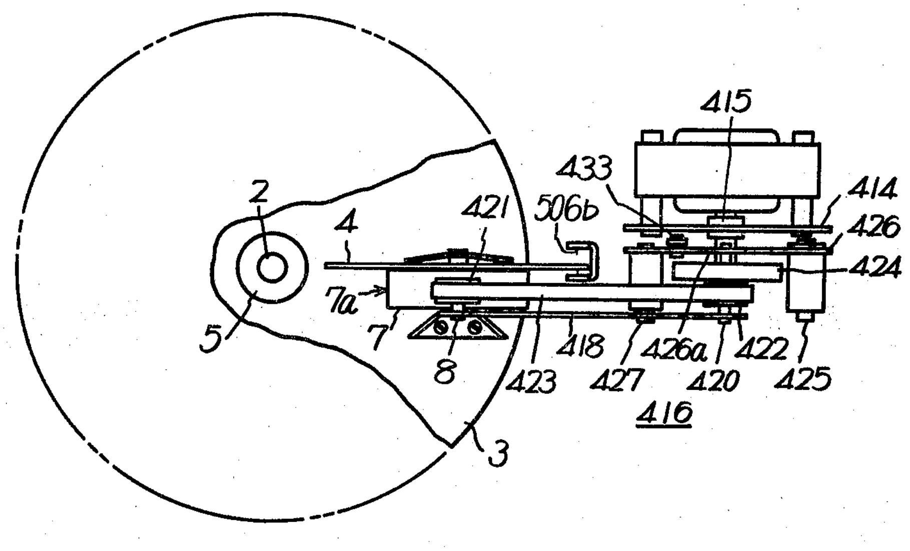
FIGURE 17 is a plan view showing a driving power transmitting device for driving a record in one condition.

A description will be made in connection with the operation of the automatic record player apparatus employing the aforementioned circuits and memory device. In FIGURE 1 reference numeral 50 identifies a motor for rotating the rotary support disc 3 and 51 indicates generally a device for revolving the turntable 7. The device 51 will hereinafter be described in detail. In FIGURE 17 showing a plan view of the device of this invention, the turntable 7 has a diameter smaller than that of the innermost sound groove of the record 4. The turntable 7 is formed so that its circumferential surface 7_a_ may be exactly cylindrical about its shaft 8. The turntable 7 is a kind of a shaft to be driven by the device 51 of this invention.

Figure 18:
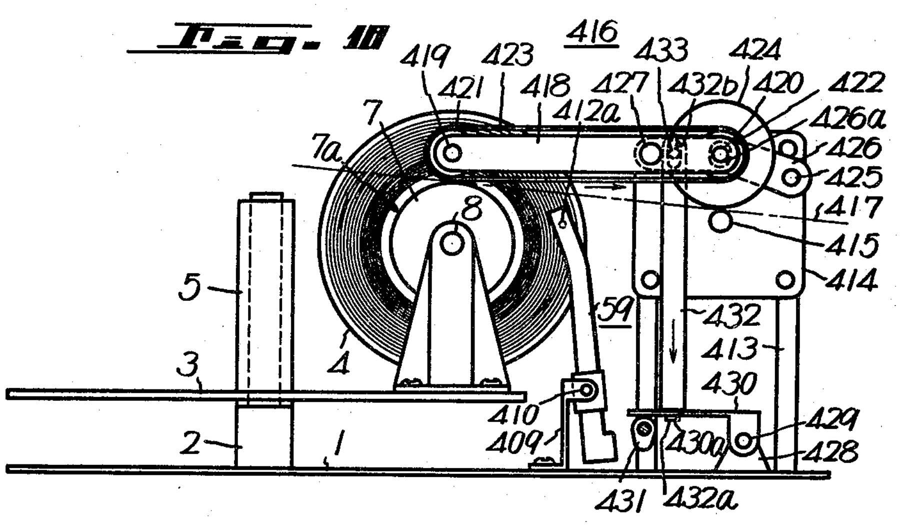
FIGURE 18 is a side view of the driving power transmitting device shown in FIGURE 17.

As illustrated in FIGURE 18, the horizontal fixed base plate 1 has planted thereon a support piece 510, to the top end of which is attached to pickup device 59 by a shaft 512. The pickup device will be described later on.

Further, the horizontal fixed base plate 1 has planted thereon a stanchion 413, which carries a motor 414. Reference numeral 415 indicates its rotary shaft and consequently its drive shaft. In the present invention the shaft 8 of the turntable 7 of a record to be played is brought in the same direction as the motor rotary shaft 415.

A driving power transmission mechanism 416 is provided between the drive shaft or the rotary shaft 415 of the motor and the shaft to be driven, namely the turntable 7, and this driving power transmission mechanism 416 is interposed between the selected turntable 7 of a record to be played and the rotary shaft 415 of the motor 414, thus suitably driving the turntable 7. In this case, the relative arrangement of the driving power transmission mechanism 416 to the turntable 7 and to the motor rotary shaft 415 is such that a rotary contact point $P_2$ between one end of the power transmission mechanism 416 and the motor rotary shaft 415 and a rotary contact point $P_1$ between the other end of the power transmission mechanism 416 and the turntable 7 may be on a tangential line 417 common to the two rotary contact points. The driving power transmission mechanism 416 has a support rod 418 having attached to both free ends thereof, for example, drum-type pulleys 421 and 422 by shafts 419 and 420, and an endless belt 423 of, for example, rubber or the like is stretched between the pulleys 421 and 422. To one pulley 422 is affixed concentrically and integrally therewith a pulley 424 having a greater diameter than the the pulley 422. To a shaft 425 provided on the stationary part, for example, on one side of the motor 414, is affixed a rotary arm 426 rotatable about the shaft 425, to the free end of which is rotatably affixed one end of the aforementioned support rod 418 by a shaft 427. In the driving power transmission mechanism 416 illustrated in the figure, the pulley 424 of a great diameter makes direct rotary contact with the motor rotary shaft 415 and the belt 423 stretched between the pulleys 421 and 422 makes direct rotary contact with the circumferential surface of the turntable 7. In this case, the distance between the shafts 419 and 420 is selected such that the rotary contact points $P_1$ and $P_2$ are on the common tangential line 417 with respect to the rotary shaft 415 and the turntable 7. Further, the length of the rotary arm 426 is also selected so that when the motor rotary shaft 415 and the turntable 7 are caused to respectively make rotary contact with the driving power transmission mechanism 416 they may be always on the aforementioned points $P_1$ and $P_2$ on the common tangential line 417.

Figure 19:
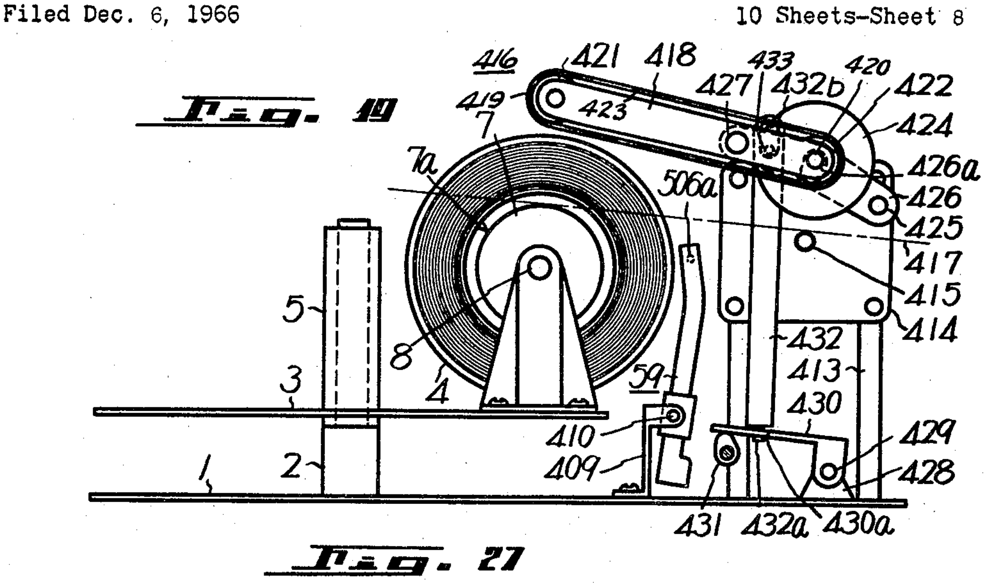
FIGURE 19 is a side view of the driving power transmitting device in other condition.

Further, a rotary piece 430 is rotatably affixed by a pin 429 to a planted piece 428 on the horizontal fixed base plate 1 and the free end of the rotary piece 430 is caused to engage with a cam 431, coupling the rotary piece 430 with the aforementioned support rod 418 through a driving rod 432. To this end, a projection 432_a_ of the lower end of the driving rod 432 is fixedly engaged with an aperture 430_a_ formed in the rotary piece 430 and an elongated aperture 432_b_ formed in the upper end of the driving rod 432 is engaged with a pin 433 planted on one side of the support rod 418. In this case, the elongated aperture 432_b_ and the pin 433 are adapted to be loosely engaged with each other. The relative arrangement of the driving rod 432 to the support rod 418 is such that when the rotary piece 430 is brought up to its highest position by the cam 431 (which is rotated by other means, though not shown), the support rod 418 is rotated to its highest position by the driving rod 432 to cause the free end of the support rod 418 on the side of the pulley 421 to go away from the margin of the record 4 as illustrated in FIGURE 19 and that when the driving rod 432 is in its lowest position the support rod 418 is caused to assume such a position as shown in FIGURE 18 by the entire weight of the driving power transmission mechanism or by a spring (not shown). In the condition depicted in FIGURE 19 the pulley 424 is slightly moved out of contact with the rotary shaft 415, while the free end portion of the support rod 418 having attached thereto the pulley 421 must be brought up to such a position as to enable rotation of the horizontal rotary disc 3 so as to select a record. For this purpose, the rotary arm 426 has formed therein an elongated aperture 426_a_, with which the pin 420 of the pulley 424 is engaged, and the support rod 418 is designed so that the side of the pulley 424 is lighter than the opposite side (the side of the pulley 421) with respect to the pin 433 engaging with the driving rod 432. With such an arrangement, when the driving rod 432 is pushed up the pulley 424 of the support rod 418 goes out of contact with the rotary shaft 415 at first and when the support rod 418 is further pushed to a certain height its shaft 420 comes into contact with the upper end of the elongated aperture 426_a_ of the rotary arm 426, with the result that as the driving rod 432 is pushed up further, the side of the pulley 421 of the support rod 418 is greatly brought up finally to such a position as depicted in FIGURE 19.

The operation of the entire apparatus illustrated will hereinbelow be described. Upon pushing a record selecting button when the apparatus is in its inoperative condition such as shown in FIGURE 19, the horizontal rotary disc 3 is turned to bring a desired record 4 to a position opposite to a pickup arm, after which the cam 431 rotates to bring the driving power transmission mechanism 416 into contact with the circumferential surface of the turntable 7 of the selected record 4 as depicted in FIGURE 18 to rotate it, and substantially at the same time a pickup device 59 is actuated to automatically play the record 4. Upon completion of the play the apparatus is automatically returned to its initial standstill condition such as shown in FIGURE 19.

With such an arrangement as described in the foregoing, since the driving power transmission mechanism 416 is provided which is normally held out of contact with the motor rotary shaft 415 and the turntable 7 but comes into driving contact with them only while in actual use, the pulleys are prevented from deformation which otherwise is likely to result from their constant rotary contact with the turntable. Especially, the driving power transmission mechanism 416 is designed to come into driving contact with the motor rotary shaft 415 and the turntable 7 at the points $P_1$ and $P_2$ on the common tangential line 417, and hence it is possible to eliminate the variations in the revolving speed of the record 4 due to the directionality of the power transmission of the driving power transmission mechanism 416 when reversely revolving the motor rotary shaft 415 and consequently the record 4.

Figure 20:
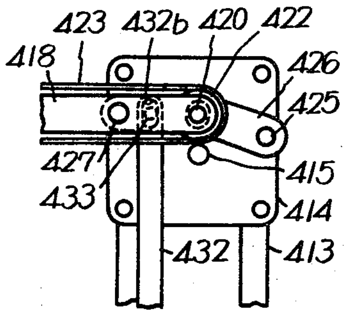
FIGURE 20 is a side view illustrating one portion of one example different from that exemplified in FIGURES 17 to 19.

In addition, the driving power transmission mechanism 416 is adapted such that the turntable 7 is driven directly by the outer surface of the belt 423, so that even if the pulley 421 is eccentric, no variations in the revolving speed of the turntable 7 are likely to occur. Therefore, the variations in the revolving speed of the turntable 7 can be further eliminated by designing the driving power transmission mechanism such that the outer surface of the belt 423 makes direct contact with the motor rotary shaft 415 while leaving out the aforementioned pulley 424, as illustrated in, for instance, FIGURE 20.

The following will describe the aforementioned pickup device 59 in detail.

Figure 23:
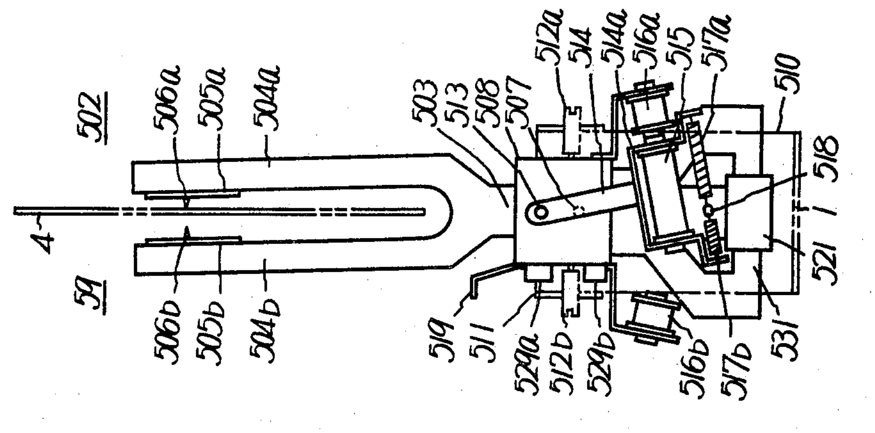
FIGURES 23 and 24 are respectively front and backs views showing the pickup device in its operative condition.
Figure 21:
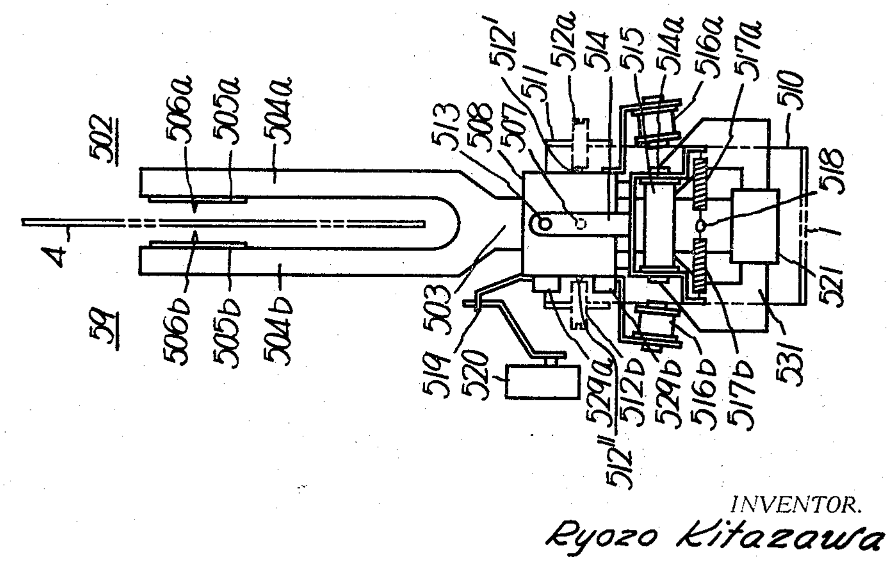
FIGURE 21 is a front view showing one example of a pickup device used in this invention.

In FIGURE 21, reference numeral 502 designates generally a pickup arm. The pickup arm 502 consists of a pair of arm portions 504*a*, 504*b*, and a base portion 503. The arm portions 504*a* and 504*b* confront in parallel relationship with each other. Cartridges 505*a* and 505*b* are respectively attached to the respective confronting surfaces of the arm portions 504*a* and 504*b* in the vicinity of their upper ends. Reference numerals 506*a* and 506*b* designate styluses which are respectively attached to the respective cartridges 505*a* and 505*b*. The styluses 506*a* and 506*b* are substantially disposed on the same line and their pointed ends are respectively projected in the opposite directions to each other on the line. In the present specification, for the benefit of explanation, FIGURES 21 and 23 are defined to be front and FIGURES 22 and 24 to be back.

A shaft 507 is attached to the pickup arm 502 at the position substantially intermediate of the pickup arm, for example, to the base portion 503. The direction of the shaft 507 intersects the projecting direction of the styluses 506*a* and 506*b* at the right angle. In other words, the direction of the shaft 507 is that from the front to the back in FIGURE 21. Frame 508 is made to be the form so as to surround the base portion 503 of the pickup arm 502. The pickup arm 502 is pivoted to the frame 508 by the shaft 507, whereby the pickup arm 502 can be rotated about the shaft 507 in the projecting direction of the stylus. A U-shaped frame member 511 which surrounds the frame 508 from its back is attached to the free end of a support member 510. The support member 510 is fixed to the horizontal fixed base plate 1 at substantially right angles thereto.

A pair of shafts 512*a* and 512*b* are respectively provided on the confronting portions of the frame member 511, the extending directions of the both shafts 512*a* and 512*b* intersecting the shaft 507 at the right angle and being substantially horizontal. A pair of projections 512*a'* and 512*b'* which are provided on the frame 8 are respectively supported by the confronting ends of the shafts 512*a* and 512*b* so that the frame 508 can be rotated about the shafts 512*a* and 512*b*.

Furthermore, a driving lever 514 is pivotably attached to the frame 508 by a shaft 513 which is fixed to the one end of the lever 514. To the other end of the lever 514 is attached a driving electromagnet 515 such as a rod-shaped one. In this case, the direction of N and S poles of the electromagnet 515 is selected to be in parallel relation with that of the styluses 506*a* and 506*b*. A pair of fixed electromagnets 516*a* and 516*b* are respectively attached to the fixed portion, for example, the frame 508 by a pair of supports 516*a'* and 516*b'* which are respectively fixed to the frame 508. In this case, the respective electromagnets are dispersed on the line connecting the N and S poles of the driving electromagnet 515 in opposing and spaced relation to the N and S poles of the magnet 515 respectively. To the electromagnets 516*a* and 516*b* are supplied DC currents so as to produce the magnetism in one of two electromagnets 516*a* and 516*b* the polarity of which is opposite to that of the confronting pole of the driving electromagnet 515 when a DC current is supplied to the electromagnet 515. In this case, the polarity of the magnetism produced in the other electromagnet is the same as that of the confronting pole of the driving electromagnet 515. Accordingly, the driving electromagnet 515 is repelled by one fixed electromagnet, for example, 516*b* and is attracted by the other, for example, the electromagnet 516*a*. In this case, it will be apparent that the above condition of the driving magnet 515 for the fixed electromagnets 516*a* and 516*b* can be changed by changing the direction of the DC current supplied to the driving electromagnet 515. Accordingly, the lever 514 having the driving electromagnet 515 on its free end portion vibrates in accordance with the vibration of the driving electromagnet 515.

In detailed explanation of fixing the driving electromagnet 515 to the lever 514 a substantially U-shaped frame member 514*a* is fixed to the free end of the lever 514 and the driving electromagnet 515 is attached to the U-shaped frame member 514*a* between the confronting free end portions thereof, as apparent from FIGURE 21.

A pair of stylus pressing springs 517*a* and 517*b* are provided between the base portion 503 of the pickup arm 502 and the driving electromagnet 515 (in FIGURE 21 between the base portion and the respective free end of the frame member 514*a*). That is, a pin 518 is fixed to the base portion 503 in the vicinity of the end portion thereof and the respective stylus pressings 517*a* and 517*b* are respectively provided between the pin 518 and one of the confronting ends of the frame member 514*a* and between the pin 518 and the other of the confronting ends. The lever 514 can be rotated to one direction along the projecting direction of the styluses 506*a* and 506*b* or to the other direction by the springs 517*a* or 517*b* when the driving electromagnet 515 is attracted by one fixed electromagnet or the other, whereby a suitable stylus pressure can be given to the record 4. In this invention, playing the record can be attained by keeping the attracting condition of the driving electromagnet 515 and one of the fixed electromagnets 516*a* and 516*b*.

In the present invention, a lever 519 is further attached to the frame 508 by which a switch 520 is closed when playing of the record is completed so that a circuit (not shown) for supplying the currents to the electromagnets 515, 516*a* and 516*b* can be opened by the switch 520. Accordingly, the stylus contacting with the record 4 can be removed therefrom. In addition, the aforementioned pair of the shafts **512*a* and 512*b* are located on the line passing through the center of the gravity of the portions including the pickup arm 502, the frame 508 and the like attached to the frame 508 so that unnecessary side pressure applied to the groove of the record 4 through the stylus 506*a* or 506*b* can be eliminated when playing the record. Reference numeral 521 identifies a balancing weight attached to the lower end of the pickup arm 502** for more effectively removing the unnecessary side pressure.

Figure 22:
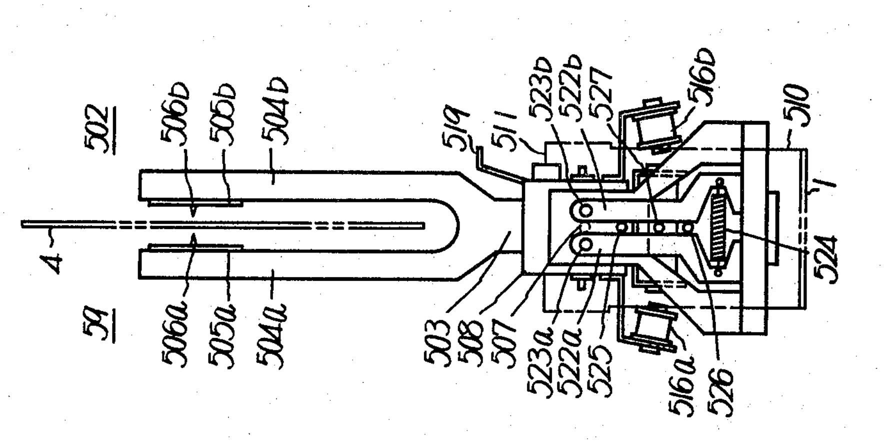
FIGURE 22 is a back view of the pickup device depicted in FIGURE 21.
Figure 24:
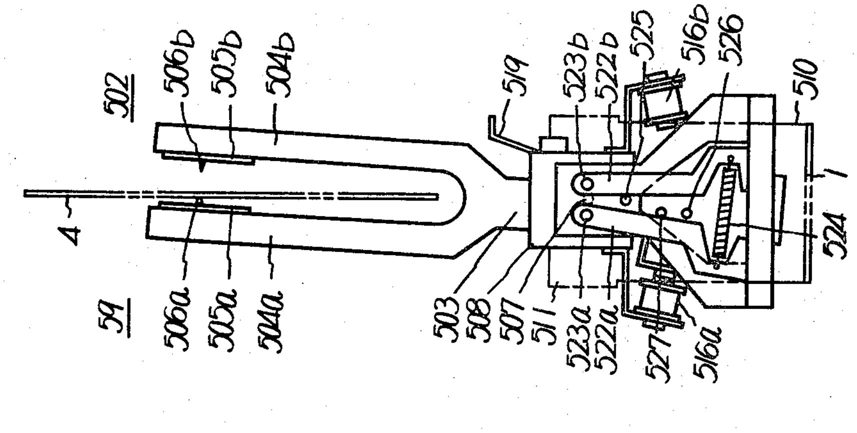

A pair of substantially parallel levers **522*a* and 522*b* are attached to the frame 508 from its back, namely levers 522*a* and 522*b* are pivoted to respective shafts 523*a* and 523*b*, which are respectively provided on the frame 508, at their upper portions, as apparent from FIGURE 22. The respective lower free ends of the parallel levers 522*a* and 522*b* are curved to extend apart from each other, if necessary, and a return spring 524 is inserted between the respective curved ends of the parallel levers for applying a bias thereto so as to approach the free ends of the parallel levers to each other. Pins 525 and 526 are respectively fixed to the frame 508 and the base portion 503 of the pickup arm 502 along the longitudinal center line common to the frame 508 and the pickup arm 502. A substantially U-shaped support member 528 is attached to the driving electromagnet 515 so as to surround the base portion 503 except the front portion thereof. A pin 527 is fixed to the back of the support member 528 at the middle point corresponding to that between the pins 525 and 526. The three pins 525, 526 and 527 are aligned on substantially the same line when the pickup arm 502 is positioned at its non-operative condition as shown in FIGURES 21 and 22. In this condition, between the confronting surfaces of the parallel levers 522*a* and 522*b* all the three pins 525, 526 and 527 are held tightly. When the driving electromagnet 515 is driven one of the parallel levers, for example, the lever 522*a* is rotated against the biasing force of the spring 524 according to the movement of the pin 527 attached to the driving electromagnet 515 through the lever 528, as shown in FIGURE 24. In this case, the other of the parallel levers, for example the lever 522*b* cannot rotate because of the fact that the pin 525 attached to the frame 508 prevents the lever 522*b* from rotation. In this condition, the stylus, for example, 506*a* contacts with the one side of the record 4**. Accordingly, playing the record is carried out.

Figure 26:
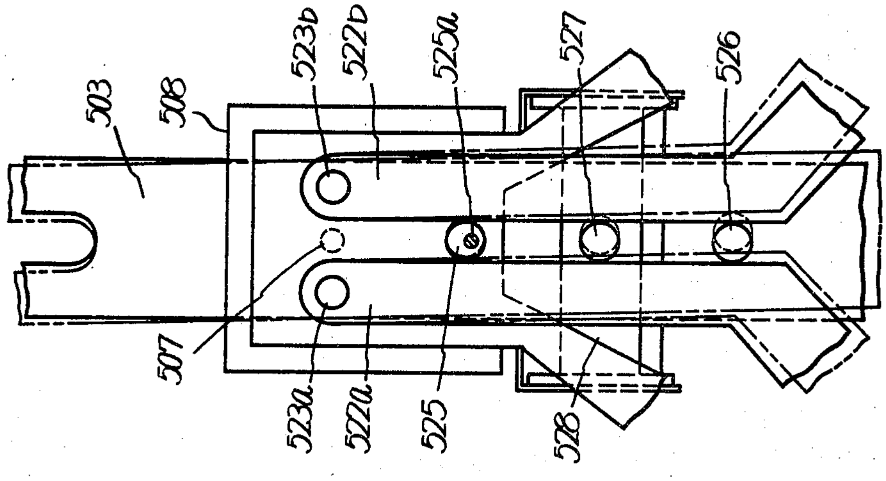
FIGURE 26 is an enlarged back view of one portion of the pickup device.

When each electromagnet is deenergized, the lever, for example, **522*a* is brought to the initial position due to the force of the spring 524. Accordingly, the pickup arm 502 is brought to the condition shown in FIGURES 21 and 22. In order to keep the pickup arm 502 at the position where the record 4 is placed along the center between the stylus tips of the styluses 506*a* and 506*b*, at least one of the pins 525 and 526, for example, the upper pin 525 is formed to be an eccentric cam, as shown in FIGURE 26, which cam can be rotated about a bolt 525*a* for attaching the eccentric cam to the frame, as shown in FIGURE 26 by the dotted line. With such an arrangement, in the condition when the electromagnets 515, 516*a* and 516*b* are not energized, the record 4 is brought to the center between the styluses 506*a* and 506*b* and then the eccentric cam is tightly attached to the frame 508 by the bolt 525*a*. Accordingly, the record 4** can be accurately positioned along the center between the styluses after the record is played.

Figure 25:
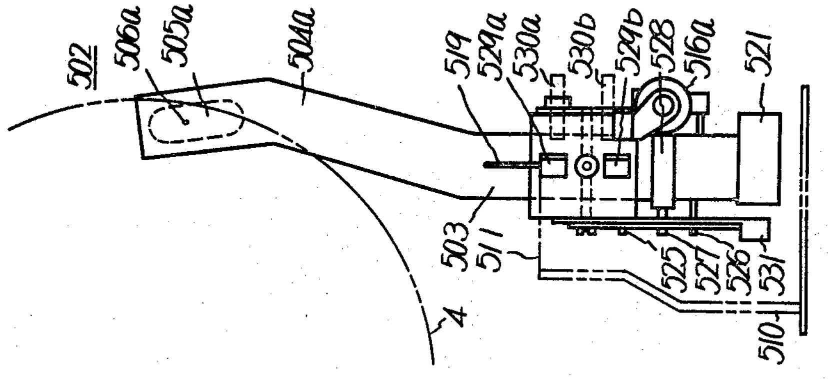
FIGURE 25 is a side view of the pickup device.

Means for rotating the pickup arm 502 along the plane of the record 4 consist of a pair of lugs **529*a* and 529*b* attached to the frame 508 and driving elements 530*a* and 530*b* abutting respectively to the respective lugs, as illustrated in FIGURE 25. The lugs 529*a* and 529*b* are respectively located at the position upper and lower than the position of the shafts 512*a* and 512*b*. By respectively driving the driving elements 530*a* and 530*b* with suitable means, for example, a cam in the opposite direction with respect to their longitudinal direction, the pickup arm can be rotated to the direction along the side of the record 4. In the figures, reference numeral 531 designates a so-called oil damper case attached to the frame 508**.

According to the pickup device 59 as explained above, the pair of styluses **506*a* and 506*b* mounted on the respective cartridges 505*a* and 505*b* can be changeably contacted with the both sides of the record 4** and which is attained by changing the direction of the DC current supplied to the driving electromagnet.

The pressure of the stylus exerted on the record 4 is easily controlled by adjusting the resiliency of the pair of springs **517*a* and 517*b***.

In the drawings and their explanation the pickup arm 502 having the two arm portions **504*a* and 504*b*** is explained. However, a rod-shaped pickup arm having a pair of styluses respectively attached to the both opposite planes of the one pickup arm in the vicinity of the free end thereof can be used instead thereof. In this case, the pair of styluses are changeably contacted with two records.

In FIGURE 1 reference numerals 61 and 62 respectively indicate drive control circuits for motors 414 and 50 for the driving device 51 and the rotary support disc 3. Reference numerals 58 and 60 designate means for controlling automatic operation of the driving device and the pickup device 59 respectively. In the figure components similar to those in FIGURE 13 are identified at the same reference numerals.

Figure 27:
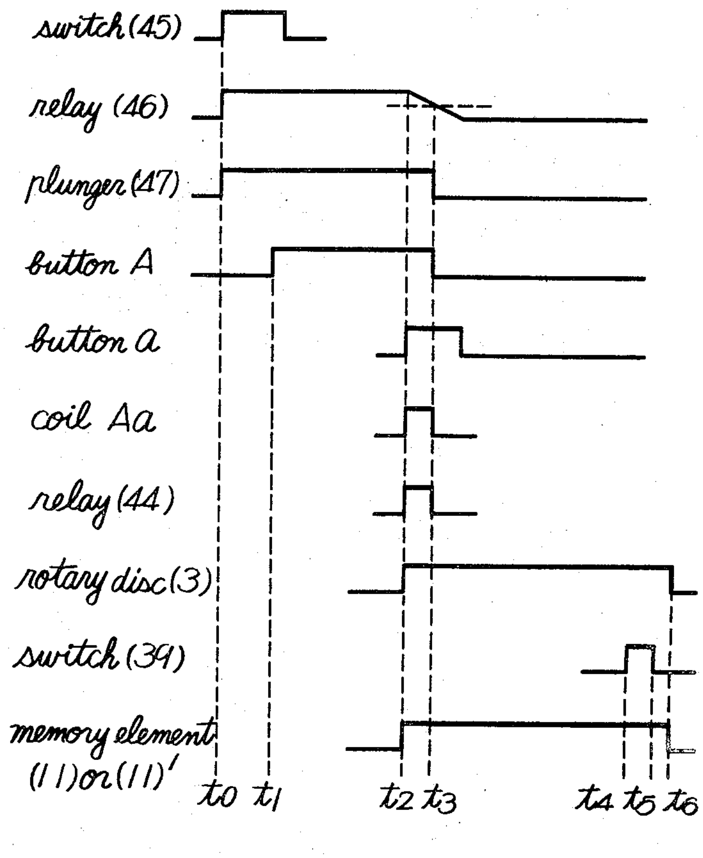
FIGURE 27 is a series of waveforms for explaining this invention and illustrating the relationship in time of currents produced at respective portions of the apparatus.

In the circuit construction shown in FIGURE 16 closing of a credit switch 45 upon putting in a coin will lead closing of a circuit of the power source 40—the contact 45—the relay 46—the normally closed contact **49*a*—the power source 40 (at a time $t_0$ in FIGURE 27). This energizes the relay 46 to close its self-holding contact 46*a* and hence put the relay 46 in its self-holding condition. At the same time, its normally open contact 46*b* is closed to energize the plunger 47. Further, the contact 46*c* is so energized by the relay 46 as to light the credit indicating lamp 49 to close a circuit of the power source 41—the contact 46*c*—the credit indicating lamp 49—the power source 41, thereby lighting the lamp 49. As a result of this, the stand-by lamp 49′ is turned out. Pushing a desired letter button, for instance, A in such a condition at a time $t_1$, the contact 42*a* closes and the plunger 47** holds the button A in its pushed position. Pushing a desired number button, for example, *a* at a time $t_2$, the change-over contact **43*aa* closes to constitute a closed circuit of the power source 40—the contact 46*a*—the relay 44—the contact 43*aa***—the coil A*a*—the power source 40, thus energizing the coil A*a*. Consequently, either one of the memory elements 11 and 11′ (shown in FIGURE 13) corresponding to the coil A*a* is attracted inwardly. In this specification, it is supposed a memory element held in its innermost position is in memorized condition.

Thus, upon feeding a current to the coil A*a*, the relay 44 is energized to open its normally closed contact **44*a*, opening the closed circuit of the power source 40—the contact 45—the relay 46—the contact 44*a*—the power source 40. Meanwhile, the relay 46 is released at a time $t_3$ dependent upon the time constant determined by the relay 46 and the capacitor 48 connected in parallel thereto. The releasing of the relay 46 leads to deenergization of the plunger 47 and opening of the contact 42*a* of the letter button A at the time $t_3$, thus returning the entire circuits to their initial conditions. The conducting time $t_2$ to $t_3$ of the coil 26 can be selected at will in accordance with the capacity of the capacitor 48**.

With the initiation of such memorization of the memory element 11 (at the time $t_2$), the discs 10 (equal to earth voltage) and 24 are electrically shorted through the contactor 17 of the memory element 11 or 11′, with the result that the motor 50, consequently the support disc 3 starts to rotate. When the engaging piece 37 of 37′ turns into contact with the memory element 11 or 11′ held its innermost position (memorized condition) during the rotation of the support disc 3, the memory element is rotated outwardly by the conductive slanting surface of the engaging piece 37 or 37′ to cancel the memory of the memory element at a time $t_6$ and hence stop the rotation of the motor 50 and consequently the support disc 3. The aforementioned pickup device 59 and the turntable driving device 51 are adjusted to play a selected record 4 at such a standstill position of the support disc 3. In such a case, the means 58, 60 and 61 are controlled by the momentary contact (from a time $t_4$ to $t_5$ of the conductive film 39 of the aforementioned engaging piece 37 or 37′ with the memory element selectively memorized, and the driving power transmission mechanism 51 drives the turntable 7 and consequently the record 4 held thereon. At the same time, the pickup device 59 automatically plays the selected record 4.

By providing the memory elements 11 and 11′ on two concentric circles as depicted in FIGURE 13, it is possible that the control means can select which side of the record is played by the pickup device 59 depending upon which memory element is memorized. In this case, both sides of the selected record can be played successively by selection of the same opposing relation of the two engaging pieces 37 and 37′ to the memory elements 11 and 11′ and by respectively giving memories to two memory elements 11 and 11′ corresponding to the engaging pieces 37 and 37′.

In the foregoing the motor 50 is controlled directly by the contactor 17 of each memory element 11 or 11′, but it is of course possible that a switch specially provided is driven by the contactor 17 to thereby drive the motor 50.

According to this invention described in the foregoing, if the magnetic plate 24 is formed to be, for example, spiral, it can easily be produced by suitable means such as punching or the like, and further the entire memory device 36 can be constructed only by disposing many memory elements between a pair of discs 9 and 10 while being fitted into the apertures 20 and 21 made in the discs.

Furthermore, many lead wires are led out from the memory device 36 corresponding to the coils 26, but the memory device 36 is fixed to the fixed base plate 1, so that wiring of the lead wires can easily be accomplished. In addition, it is sufficient to mount only two engaging pieces 37 and 37′ on the rotary support disc 3, and the conductive film 39 of each engaging piece can easily be connected to external circuits by the use of, for example, a slip ring or the like, though not shown.

It will be apparent that many modifications and variations may be effected without departing from the scope of the novel concepts of this invention.

What I claim is:

1. An automatic record player apparatus comprising a support plate, means for driving said support plate, support means mounted on said support plate, a plurality of turntables rotatably supported on the support means, a plurality of records, mounted on the turntables, selecting means for selecting one of said plurality of turntables and records, a power source, means for driving said selected record, engaging means attached to said support plate on the side opposite to said support means, and memory means including a pair of spaced plates, a third plate supported between said pair of spaced plates, said third plate formed on the outer periphery thereof a plurality of projections, each of said projections having wound thereon a coil which is excited by said power source in accordance with the operation of said selecting means, a plurality of contactors disposed between said pair of spaced plates, each of said contactors aligned with the outer end portion of each of said projections, one end portion of each of said contactors protruding beyond one of said pair of spaced plates and movable to selectively engage said engaging means, whereby when said selecting means is energized, one of said plurality of coils is excited by said power source to attract the aligned contactor and thereby cause said support plate driving means to drive said support plate, the movement of said support plate causing said engaging means to engage said attracted contactor for operating said record driving means and further movement of said support plate causing the engaging means to disengage from said aligned contactor to stop the operation of said support plate driving means.

2. An automatic record player apparatus according to claim 1 wherein each turntable has a shaft projecting from each side and both end portions of said shaft formed into arc-shaped configurations.

3. An automatic record player apparatus as claimed in claim 2, wherein said record support means has a groove for receiving said shaft, whereby said groove supports a turntable which is arc-shaped.

4. An automatic record player apparatus as claimed in claim 1 wherein the rotational speed of said record may be changed by varying the diameter of the corresponding turntable.

5. An automatic record player apparatus as claimed in claim 1, wherein each of said contactors has a permanent magnet at the position aligned with the outer end of said projection so as to be positively attracted to the corresponding projection.

6. An automatic record player apparatus as claimed in claim 1, wherein the ends of alternate projections of said plurality of projections are formed in a circle and the ends of the other projections formed on another circle and each of said contactors mounted to align with an end surface of said projections.

7. An automatic record player apparatus as claimed in claim 1, wherein said record driving means includes belt driving means and the belt of said belt driving means contacting a selected turntable for rotating it.

References Cited

UNITED STATES PATENTS

| | | | |
|---|---|---|---|
| 2,323,365 | 7/1943 | Andrews | 274—23 X |
| 2,509,054 | 5/1950 | Davis | 274—9.1 X |
| 2,979,336 | 4/1961 | Ristau et al. | 274—10 |
| 3,131,800 | 5/1964 | Osborne et al. | 274—10.1 X |

FOREIGN PATENTS

| | | |
|---|---|---|
| 225,549 | 11/1959 | Australia. |
| 1,129,259 | 9/1956 | France. |

HARRY N. HAROIAN, *Primary Examiner.*